United States Patent
Zhou et al.

(10) Patent No.: US 9,087,685 B2
(45) Date of Patent: Jul. 21, 2015

(54) METHOD FOR RAISING LUMINOUS EFFICIENCY OF FIELD EMISSIVE LUMINESCENT MATERIAL, LUMINESCENT GLASS ELEMENT AND THE PREPARING METHOD THEREOF

(75) Inventors: Mingjie Zhou, Shenzhen (CN); Wenbo Ma, Shenzhen (CN); Yugang Liu, Shenzhen (CN)

(73) Assignee: OCEAN'S KING LIGHTING SCIENCE & TECHNOLOGY CO., LTD., Shenzhen (CN)

( * ) Notice: Subject to any disclaimer, the term of this patent is extended or adjusted under 35 U.S.C. 154(b) by 896 days.

(21) Appl. No.: 13/376,385

(22) PCT Filed: Jun. 23, 2009

(86) PCT No.: PCT/CN2009/072403
§ 371 (c)(1),
(2), (4) Date: Dec. 6, 2011

(87) PCT Pub. No.: WO2010/148553
PCT Pub. Date: Dec. 29, 2010

(65) Prior Publication Data
US 2012/0077025 A1    Mar. 29, 2012

(51) Int. Cl.
*B32B 17/06* (2006.01)
*H01J 63/06* (2006.01)
*C03C 3/062* (2006.01)
*C03C 3/095* (2006.01)
*C03C 4/12* (2006.01)
*C03C 17/06* (2006.01)
*C09K 11/77* (2006.01)

(52) U.S. Cl.
CPC ............. *H01J 63/06* (2013.01); *C03C 3/062* (2013.01); *C03C 3/095* (2013.01); *C03C 4/12* (2013.01); *C03C 17/06* (2013.01); *C09K 11/7774* (2013.01); *C03C 2217/77* (2013.01); *Y10T 428/265* (2015.01)

(58) Field of Classification Search
None
See application file for complete search history.

(56) References Cited

U.S. PATENT DOCUMENTS

| | | | | |
|---|---|---|---|---|
| 3,523,091 A | * | 8/1970 | McAllister | 252/301.4 F |
| 4,629,582 A | * | 12/1986 | Terashima et al. | 252/301.4 P |
| 5,391,320 A | * | 2/1995 | Buchanan et al. | 252/301.4 F |
| 6,271,160 B1 | * | 8/2001 | Yamamoto et al. | 501/42 |
| 6,372,155 B1 | * | 4/2002 | Yamazaki et al. | 252/301.4 R |
| 2001/0048966 A1 | * | 12/2001 | Trumble et al. | 427/66 |

(Continued)

*Primary Examiner* — Robert S Loewe

(57) ABSTRACT

A method for raising luminous efficiency of field emissive luminescent material, a luminescent glass element and the preparing method thereof are provided. The method for raising luminous efficiency of field emissive luminescent material comprises: forming a nonperiodic metal film having metal micro-nano structure on the surface of a luminescent glass body having a composition of $aM_2O.bY_2O_3.cSiO_2.dTb_2O_3$; eradiating cathode ray to the metal film, and the cathode ray penetrating the metal film to make the glass body to luminesce. The luminescent glass element has a luminescent glass body, and a nonperiodic metal film having metal micro-nano structure forming on the glass body. The preparing method of the element comprises: preparing a luminescent glass body, forming a metal film on the surface of the luminescent glass body, annealing and cooling to obtain the luminescent glass element. The luminescent glass element in the invention has good transmissivity, high homogenization and luminous efficiency, good stability and simple structure. The preparing method thereof is simple and has a low cost.

12 Claims, 2 Drawing Sheets

(56) References Cited

U.S. PATENT DOCUMENTS

2006/0037366 A1* 2/2006 Chen et al. .............. 65/399
2012/0146500 A1* 6/2012 Zhou et al. .............. 315/1
2012/0146501 A1* 6/2012 Zhou et al. .............. 315/1
2012/0146502 A1* 6/2012 Zhou et al. .............. 315/1
2012/0153821 A1* 6/2012 Zhou et al. .............. 315/1

* cited by examiner

METHOD FOR RAISING LUMINOUS EFFICIENCY OF FIELD EMISSIVE LUMINESCENT MATERIAL, LUMINESCENT GLASS ELEMENT AND THE PREPARING METHOD THEREOF

FIELD OF THE INVENTION

The present invention belongs to a technical field of luminescent material, and relates to a method for raising luminous efficiency, a luminescent element and the preparing method thereof, more particularly, to a method for raising luminous efficiency of field emissive luminescent material, a luminescent glass element and the preparing method thereof.

BACKGROUND OF THE INVENTION

At present, in the vacuum micro-electronic field, field emissive device has shown wide application prospects and has attracted much attention of the research institutes home and abroad in the fields of lighting and display. Its operating principle is as follows: in vacuum environment, forward voltage is applied to field emissive arrays (FEAs) to form an accelerating field by the anode; then electrons emitted by the cathode is used to bombard the luminescent material on the anode plate after acceleration so as to give out light. The field emissive device has a broad operating temperature range (−40° C.~80° C.), short response time (<1 ms) and simple structure. Besides, it can save electricity, thus meeting the demand of green environmental protection. Some materials such as fluorescent powders, luminescent glasses and luminescent films can be used as the luminescent materials of the filed emissive device. However, low luminous efficiency is the substantive problem for all such materials, which greatly limits the application of the field emissive device, especially its application in the lighting field.

Surface plasmon (SP) is one kind of wave that travels along the interface between metal and medium, the amplitude of which decays exponentially with its distance away from the interface. When the surface structure of the metal is changed, the properties, dispersion relation, excitation mode and coupling effect of the surface plasmon polaritons (SPPs) will change greatly. The electromagnetic field induced by the SPPs can not only limit the travel of the wave in sub-wavelength structure, but also yield and control the electromagnetic radiation from optical frequency to microwave region, so as to achieve the active control of light propagation. The excitation of SPPs will increase the optical state density and enhance the spontaneous radiation rate so that the internal quantum efficiency is greatly increased to help the existing various solid state luminescent devices get rid of the difficulty of low luminous efficiency, which will promote a new type of luminescent device with ultrahigh brightness and high-speed operation.

SUMMARY OF THE INVENTION

The objective of the present invention is to provide a method for greatly raising luminous efficiency of field emissive luminescent material which is simple in process, convenient and reliable, aiming at the defect of low luminous efficiency in the prior art.

Another objective of the present invention is to provide a luminescent glass element which has good transmissivity, high homogenization and luminous efficiency, good stability and simple structure and can be used in the method for greatly raising luminous efficiency of field emissive luminescent material.

Another objective of the present invention is to provide a preparing method for luminescent glass element which is simple in process and low in cost.

According to an aspect, a method for raising luminous efficiency of a field emissive luminescent material is provided, which comprising following steps: taking a luminescent glass as a body; forming a nonperiodic metal film having metal micro-nano structures on a surface of the luminescent glass body to prepare a luminescent glass element; eradiating a cathode ray to the luminescent glass element, wherein the cathode ray penetrating the metal film and exciting the luminescent glass body to luminesce; a chemical general formula of the luminescent glass body is $aM_2O \cdot bY_2O_3 \cdot cSiO_2 \cdot dTb_2O_3$, wherein M is an alkali metal, and a, b, c and d are molar fractions, ranges of which are respectively as follows: the range of a is 25~60, the range of b is 0.01~15, the range of c is 40~70 and the range of d is 0.01~15.

According to another aspect, a luminescent glass element used by the method for raising luminous efficiency of a field emissive luminescent material is provided, which comprising a luminescent glass body; a metal film having metal microstructure is arranged on a surface of the luminescent glass body; the luminescent glass body comprises composite oxides with a following chemical general formula:

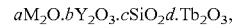

$$aM_2O \cdot bY_2O_3 \cdot cSiO_2 d \cdot Tb_2O_3,$$

wherein M is an alkali metal, and a, b, c and d are molar fractions, ranges of which are respectively as follows: the range of a is 25~60, the range of b is 0.01~15, the range of c is 40~70 and the range of d is 0.01~15.

In the luminescent glass element, the alkali metal is at least one selected from a group of Na, K and Li.

In the luminescent glass element, the metal of the metal film is at least one selected from a group of gold, silver, aluminum, copper, titanium, iron, nickel, cobalt, chromium, platinum, palladium, magnesium and zinc.

In the luminescent glass element, the metal of the metal film is at least one selected from a group of gold, silver and aluminum.

In the luminescent glass element, a thickness of the metal film is 0.5 nanometer~200 nanometer.

In the luminescent glass element, the thickness of the metal film is 1 nanometer~100 nanometer.

According to another aspect, a preparing method for luminescent glass element is provided, which comprising following steps:

preparing a luminescent glass body which comprising composite oxides with a following chemical general formula: $aM_2O \cdot bY_2O_3 \cdot cSiO_2 \cdot dTb_2O_3$, wherein M is an alkali metal, and a, b, c and d are molar fractions, ranges of which are respectively as follows: the range of a is 25~60, the range of b is 0.01~15, the range of c is 40~70 and the range of d is 0.01~15;

forming a metal film on a surface of the luminescent glass body; and annealing the luminescent glass body and the metal film in vacuum so that the metal film forms metal microstructures, and then obtaining the desired luminescent glass element after cooling.

In the preparing method for luminescent glass element, preparing steps for the luminescent glass body are as follows: taking alkali metal salt, $SiO_2$, $Y_2O_3$ and $Tb_4O_7$ in their respective corresponding molar fraction as raw materials; melting the raw materials at 1200° C.~1500° C.; placing a melted product in a reducing atmosphere after cooling; then annealing a reduced product at 600° C.~1100° C. to obtain the luminescent glass body.

In the preparing method for luminescent glass element, the metal film is formed through sputtering or evaporating a metal onto a surface of the luminescent glass body.

In the preparing method for luminescent glass element, the annealing in vacuum is proceeded at 50° C.~650° C. for 5 minutes~5 hours.

In the preparing method for luminescent glass element, the annealing in vacuum is preferably proceeded at 100° C.~500° C. for 15 minutes~3 hours.

In the present invention, a metal film is arranged on the luminescent glass with a chemical formula of $aM_2O.bY_2O_3.cSiO_2.dTb_2O_3$. Then surface plasmon can be formed at the interface between such metal film and the luminescent glass in the cathode ray. Therefore, the luminous efficiency of the luminescent glass with a chemical formula of $aM_2O.bY_2O_3.cSiO_2.dTb_2O_3$ is enhanced through the surface plasmon effect. Through this method, the problem of low luminous efficiency of field emissive luminescent material is solved.

In the present invention, the luminescent glass element is composed of a metal film and a luminescent glass, wherein the luminescent glass is a green luminescent glass with a chemical formula of $aM_2O.bY_2O_3.cSiO_2.dTb_2O_3$, and the metal film has a nonperiodic metal micro-nano structure. The eradiated cathode ray firstly penetrates the metal film and further excites the luminescent glass to luminesce. During this process, surface plasmon effect is produced at the interface between the metal film and the luminescent glass. Through the surface plasmon effect, the internal quantum efficiency of the luminescent glass is greatly increased, that is the spontaneous radiation of the luminescent glass is greatly enhanced, and the luminous efficiency of the luminescent glass is further greatly enhanced, so that the problem of the low luminous efficiency of the luminescent material is solved and the luminescent properties of the luminescent glass are increased.

Furthermore, for the preparing method for luminescent glass element, it is only needed to form a metal film on the luminescent glass body and anneal the composite structure to obtain the desired luminescent glass element, thus making the preparing process simple, low-cost and have broad prospects in both production and application.

BRIEF DESCRIPTION OF THE DRAWINGS

The present invention will be further described with reference to the accompanying drawings and embodiments in the following. In the Figures.

wherein the test condition for the cathodoluminescence spectrum is: the acceleration voltage of electron beam excitation is 7 KV.

DETAILED DESCRIPTION OF THE PREFERRED EMBODIMENT

To make the objective, technical solution and advantage of the present invention more clear, the present invention will be further explained in detail with reference to accompanying drawings and examples hereinafter. It should be understood that the examples described here are only intended to explain the present invention while not to limit the present invention.

A method for raising luminous efficiency of field emissive luminescent material is provided, which specifically comprising following steps: taking a luminescent glass as a body; sputtering a metallic material onto the surface of the luminescent glass body to form a nonperiodic metal film having a metal micro-nano structure to prepare a luminescent glass element; eradiating cathode ray to the luminescent glass element, penetrating the metal film to excite the luminescent glass body to luminesce by the cathode ray. The metallic material can be one or more selected from the group of gold, silver, aluminum, copper, titanium, iron, nickel, cobalt, chromium, platinum, palladium, magnesium and zinc. Preferably, the metallic material is one or more selected from the group of gold, silver and aluminum. The luminescent glass body is one kind of green luminescent glass, the chemical formula of which is $aM_2O.bY_2O_3.cSiO_2.dTb_2O_3$, wherein M is at least one selected from the group of Na, K and Li, and a, b, c and d are molar fractions, the ranges of which are respectively as follows: the range of a is 25~60, the range of b is 0.01~15, the range of c is 40~70 and the range of d is 0.01~15.

Figure 1:
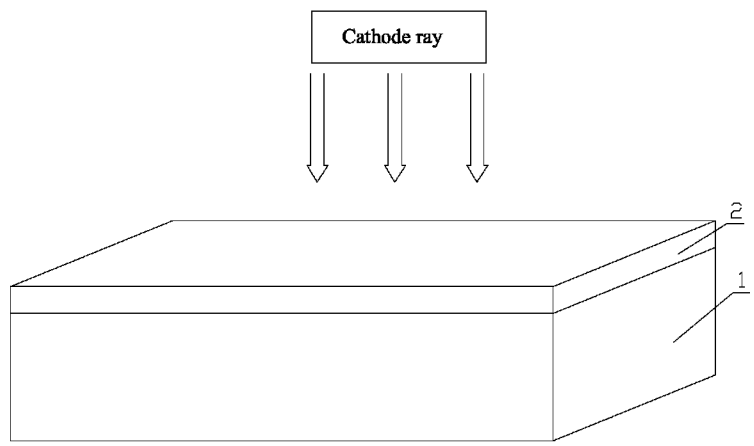
FIG. 1 is a structure diagram of the luminescent glass element of the present invention.

Referring to FIG. 1, the glass element used by the above-mentioned method for raising luminous efficiency of field emissive luminescent material comprises a luminescent glass body 1 and a metal film 2 arranged on the surface of the luminescent glass body 1. The metal film 2 has a metal microstructure, which is also referred to as a micro-nano structure at times. Further, the metal microstructure is nonperiodic, that is, the metal microstructure is composed of metallic crystals in random arrangement.

The luminescent glass body 1 comprises composite oxides with the following chemical general formula: $aM_2O.bY_2O_3.cSiO_2.dTb_2O_3$, wherein M is an alkali metal, and a, b, c and d are molar fractions, the ranges of which are respectively as follows: the range of a is 25~60, the range of b is 0.01~15, the range of c is 40~70 and the range of d is 0.01~15. The luminescent glass body 1 comprises oxides of terbium, which can develop their luminous effect sufficiently in the luminescent glass having such constituents. Besides, the luminescent glass body 1 also has good transmissivity.

Among them, the metal film 2 can have the metals with good chemical stability, such as the metals that are not easy to be oxidized and eroded. It can also be common metals, which is preferably formed from at least one metal selected from the group of gold, silver, aluminum, copper, titanium, iron, nickel, cobalt, chromium, platinum, palladium, magnesium and zinc and is more preferably formed from at least one metal selected from the group of gold, silver and aluminum. The metal species in the metal film 2 can be their mono-ones or composite ones, while the composite ones can be composed of two or more alloys. For example, the metal film 2 can be silver-aluminum alloy film or gold-aluminum alloy film, wherein the weight fraction of the silver or the gold is preferably above 70%. Preferably, the thickness of the metal film 2 is 0.5 nanometer-200 nanometer. More preferably, the thickness of the metal film 2 is 1 nanometer-100 nanometer.

The alkali metal M is preferably at least one selected from the group of Na, K and Li.

As a luminescent element, the above-mentioned luminescent glass element can be widely used in luminescent device with ultrahigh brightness and high-speed operation, such as field emissive display, field emissive light source or large advertise display board. Taking the field emissive display as an example, forward voltage is applied to field emissive arrays to form an accelerating field by the anode, and then electrons are eradiated by the cathode, that is cathode ray is eradiated to the metal film 2. Then surface plasmon is formed between the metal film 2 with microstructures and the luminescent glass body 1. Through the surface plasmon effect, the internal quantum efficiency of the luminescent glass body 1 is greatly increased, that is the spontaneous radiation of the luminescent glass is greatly enhanced, and the luminous efficiency of the luminescent glass body is further enhanced, so that the problem of the low luminous efficiency of the luminescent material is solved. Moreover, since the metal film is formed on the surface of the luminescent glass body 1, uniform interface is thus formed between the whole metal film and the luminescent glass body 1, which can improve the uniformity of luminescence.

The preparing method for above-mentioned luminescent glass element comprises the following steps:

preparing a luminescent glass body: taking alkali metal of analytical pure, $SiO_2$ of analytical pure as well as 99.99% $Y_2O_3$ and 99.99% $Tb_4O_7$ as main raw materials; weighting the corresponding raw materials in accordance with the molar fraction of each element in chemical formula of $aM_2O.bY_2O_3.cSiO_2.dTb_2O_3$; melting the raw materials at 1200° C.~1500° C. for 1~5 h; placing the melted product in reducing atmosphere after cooling to room temperature; then annealing the reduced product at 600° C.~1100° C. for 1~20 h to obtain the green luminescent glass body. Besides, the luminescent glass body can be further cut and polished to a certain size to obtain the desired luminescent glass body;

forming a metal film on the surface of the luminescent glass body: the metal film is formed through sputtering or evaporating metal onto the surface of the luminescent glass body;

and annealing the luminescent glass body and the metal film in vacuum so that the metal film forms metal microstructures and then obtaining the desired luminescent glass element after cooling to room temperature. More specifically, the annealing in vacuum is proceeded at 50° C.~650° C. for 5 minutes~5 hours after the metal film is formed on the surface of the luminescent glass body, and then the annealed product is cooled to room temperature naturally. Wherein the annealing temperature is preferably at 100° C.~500° C., and the annealing time is preferably 15 minutes~3 hours.

Similar to the structure described previously, the metal film 2 can be the metals with good chemical stability, such as the metals that are not easy to be oxidized and eroded. It can also be common metals, which is preferably formed from at least one metal selected from the group of gold, silver, aluminum, copper, titanium, iron, nickel, cobalt, chromium, platinum, palladium, magnesium and zinc and is more preferably formed from at least one metal selected from the group of gold, silver and aluminum. Preferably, the thickness of the metal film 2 is 0.5 nanometer~200 nanometer. More preferably, the thickness of the metal film 2 is 1 nanometer~100 nanometers. The alkali metal M is preferably at least one selected from the group of Na, K and Li. The metal film is formed through sputtering or evaporating metal onto the surface of the luminescent glass body. After the metal film is formed on the surface of the luminescent glass body, the annealing in vacuum is proceeded at 50° C.~650° C. for 5 minutes~5 hours, and then the annealed product is cooled to room temperature. Wherein the annealing temperature is preferably at 100° C.~500° C., and the annealing time is preferably 15 minutes~3 hours.

The luminescent glass element has various features of structure and constituent described previously. In practical application, for example, when it is used in the field emissive display or the lighting source, forward voltage is applied to field emissive arrays to form an accelerating field by the anode in vacuum environment, and then cathode ray is eradiated by the cathode. Under the excitation of the cathode ray, the electron beam firstly penetrates the metal film 2 and further excites the luminescent glass body 1 to luminesce. During this process, surface plasmon effect is produced at the interface between the metal film 2 and the luminescent glass body 1. Through this effect, the internal quantum efficiency of the luminescent glass body is greatly increased, that is the spontaneous radiation of the luminescent glass is greatly enhanced, and the luminous efficiency of the luminescent glass is further enhanced.

Surface plasmon (SP) is one kind of wave that travels along the interface between metal and medium, the amplitude of which decays exponentially with its distance away from the interface. When the surface structure of the metal is changed, the properties, dispersion relation, excitation mode and coupling effect of the surface plasmon polaritons (SPPs) will change greatly. The electromagnetic field induced by the SPPs can not only limit the travel of the wave in sub-wavelength structure, but also yield and control the electromagnetic radiation from optical frequency to microwave region, so as to achieve the active control of light propagation. Therefore, the excitation property of SPPs is utilized in the example to increase the optical state density of the luminescent glass body and enhance its spontaneous radiation rate. Besides, the coupling effect of Surface Plasmon can be utilized. When the luminescent glass body luminesces, a coupling resonance effect can take place so that the internal quantum efficiency and the luminous efficiency of the luminescent glass body are greatly increased.

Different constitutes as well as preparing methods and properties of the luminescent glass element are illustrated through a plurality of examples hereinafter.

EXAMPLE 1

A green luminescent glass $30Li_2O.6Y_2O_3.60SiO_2.4Tb_2O_3$ (each number before the oxide represents molar fraction, which is the same hereinafter) with a size of 1×1 cm² and a polished surface prepared through the above-mentioned preparing method is chosen to be a body. A metallic silver film with a thickness of 2 nanometer is deposited on the surface of the body by the usage of a magnetron sputtering device. Then the body with the metallic silver film is placed in an environment with a vacuum degree less than $1 \times 10^{-3}$ Pa and annealed at 300° C. for half an hour. After that, the luminescent glass element of the present example is obtained after cooling to room temperature. As shown in FIG. 1, it is the structure diagram of the luminescent glass element. In the luminescent glass element of the example, a luminescent glass 1 is used as the body and a metal film is arranged on it. A metallic silver film 2 is selected in the example and the cathode ray eradiated by an electron gun directly hits the metallic silver film 2. The cathode ray firstly penetrates the silver film 2 and further excites the luminescent glass 1 to luminesce.

Figure 2:
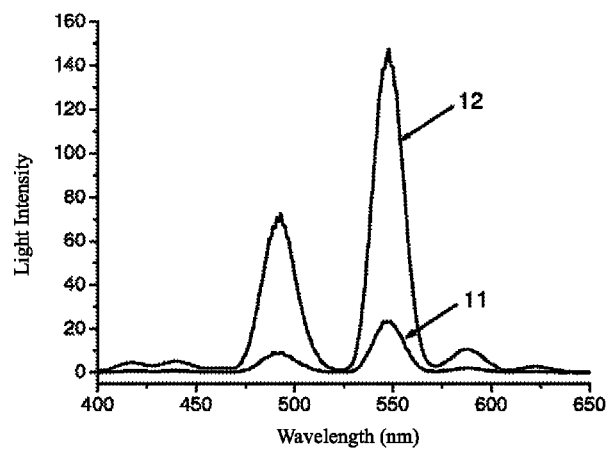
FIG. 2 is a contrast luminescence spectrum between the luminescent glass element of example 1 and the luminescent glass without a metal film.

The luminescence spectrum shown in FIG. 2 is generated through the bombardment of the cathode ray produced by the electron gun on the luminescent glass element of the example. The curve 11 in FIG. 2 is the luminescence spectrum of the glass without the metallic silver film, while the curve 12 is the luminescence spectrum of the luminescent glass element prepared in the example. It can be seen from the figure, compared with the luminescent glass without the metallic silver film 2, the luminescent integrated intensity from 400 nanometer to 650 nanometer of the luminescent glass element of the example has been enhanced by 6.5 folds since surface Plasmon effect is generated between the metallic silver layer 2 and the luminescent glass 1. The luminescent properties can thus be greatly improved.

EXAMPLE 2

A green luminescent glass $30Li_2O.6Y_2O_3.60SiO_2.4Tb_2O_3$ with a size of 1×1 cm² and a polished surface prepared through the above-mentioned preparing method is chosen to be a body. A metallic silver film with a thickness of 8 nanometer is deposited on the surface of the body by the usage of a magnetron sputtering device. Then the body with the metallic silver film is placed in an environment with a vacuum degree less than $1\times10^{-3}$ Pa and annealed at 300° C. for half an hour. After that, the luminescent glass element of the present example is obtained after cooling to room temperature.

Figure 3:
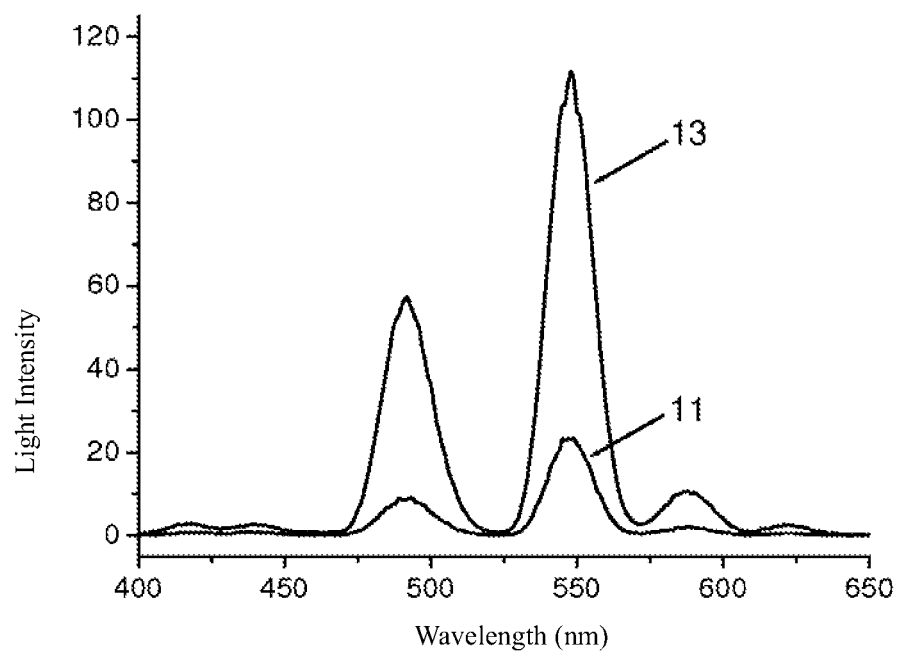
FIG. 3 is a contrast luminescence spectrum between the luminescent glass element of example 2 and the luminescent glass without a metal film.

The luminescence spectrum shown in FIG. 3 is generated through the bombardment of the cathode ray produced by the electron gun on the luminescent glass element of the example. The curve 11 in FIG. 3 is the luminescence spectrum of the glass without the metallic silver film, while the curve 13 is the luminescence spectrum of the luminescent glass element prepared in the example. It can be seen from the figure, compared with the luminescent glass without the metallic silver film, the luminescent integrated intensity from 400 nanometer to 650 nanometer of the luminescent glass element of the example has been enhanced by 5 folds since surface Plasmon effect is generated between the metallic silver layer 2 and the luminescent glass 1. The luminescent properties can thus be greatly improved. The luminescent spectrums of the following examples are the same as those of the example 1 and 2; each luminescent glass element has the similar luminescent intensity effect. Thus the mentioned aspects will not be repeated for concision hereinafter.

EXAMPLE 3

A green luminescent glass $25Na_2O.15Y_2O_3.45SiO_2.10Tb_2O_3$ with a size of 1×1 cm² and a polished surface prepared through the above-mentioned preparing method is chosen to be a body. A metallic gold film with a thickness of 0.5 nanometer is deposited on the surface of the body by the usage of a magnetron sputtering device. Then the body with the metallic gold film is placed in an environment with a vacuum degree less than $1\times10^{-3}$ Pa and annealed at 200° C. for 1 h. After that, the luminescent glass element of the present example is obtained after cooling to room temperature.

EXAMPLE 4

A green luminescent glass $27Na_2O.0.01Y_2O_3.70SiO_2.15Tb_2O_3$ with a size of 1×1 cm² and a polished surface prepared through the above-mentioned preparing method is chosen to be a body. A metallic aluminum film with a thickness of 200 nanometer is deposited on the surface of the body by the usage of a magnetron sputtering device. Then the body with the metallic aluminum film is placed in an environment with a vacuum degree less than $1\times10^{-3}$ Pa and annealed at 500° C. for 5 h. After that, the luminescent glass element of the present example is obtained after cooling to room temperature.

EXAMPLE 5

A green luminescent glass $32Na_2O.1.5Y_2O_3.65SiO_2.12Tb_2O_3$ with a size of 1×1 cm² and a polished surface prepared through the above-mentioned preparing method is chosen to be a body. A metallic magnesium film with a thickness of 100 nanometer is evaporated on the surface of the body by the usage of an electron beam evaporation device. Then the body with the metallic magnesium film is placed in an environment with a vacuum degree less than $1\times10^{-3}$ Pa and annealed at 650° C. for 5 minutes. After that, the luminescent glass element of the present example is obtained after cooling to room temperature.

EXAMPLE 6

A green luminescent glass $35Na_2O.0.5Y_2O_3.50SiO_2.13Tb_2O_3$ with a size of 1×1 cm² and a polished surface prepared through the above-mentioned preparing method is chosen to be a body. A metallic palladium film with a thickness of 1 nanometer is evaporated on the surface of the body by the usage of an electron beam evaporation device. Then the body with the metallic palladium film is placed in an environment with a vacuum degree less than $1\times10^{-3}$ Pa and annealed at 100° C. for 3 h. After that, the luminescent glass element of the present example is obtained after cooling to room temperature.

EXAMPLE 7

A green luminescent glass $38Na_2O.12Y_2O_3.43SiO_2.0.5Tb_2O_3$ with a size of 1×1 cm² and a polished surface prepared through the above-mentioned preparing method is chosen to be a body. A metallic platinum film with a thickness of 5 nanometer is evaporated on the surface of the body by the usage of an electron beam evaporation device. Then the body with the metallic platinum film is placed in an environment with a vacuum degree less than $1\times10^{-3}$ Pa and annealed at 450° C. for 15 minutes. After that, the luminescent glass element of the present example is obtained after cooling to room temperature.

EXAMPLE 8

A green luminescent glass $28Na_2O.10Y_2O_3.68SiO_2.2Tb_2O_3$ with a size of 1×1 cm² and a polished surface prepared through the above-mentioned preparing method is chosen to be a body. A metallic iron film with a thickness of 20 nanometer is evaporated on the surface of the body by the usage of an electron beam evaporation device. Then the body with the metallic iron film is placed in an environment with a vacuum degree less than $1\times10^{-3}$ Pa and annealed at 50° C. for 5 h. After that, the luminescent glass element of the present example is obtained after cooling to room temperature.

EXAMPLE 9

A green luminescent glass $35K_2O.8Y_2O_3.55SiO_2.0.01Tb_2O_3$ with a size of 1×1 cm² and a polished surface prepared through the above-mentioned preparing method is chosen to be a body. A metallic titanium film with a thickness of 10 nanometer is evaporated on the surface of the body by the usage of an electron beam evaporation device. Then the body with the metallic titanium film is placed in an environment with a vacuum degree less than $1\times10^{-3}$ Pa and annealed at 150° C. for 2 h. After that, the luminescent glass element of the present example is obtained after cooling to room temperature.

EXAMPLE 10

A green luminescent glass $40K_2O.5Y_2O_3.40SiO_2.9Tb_2O_3$ with a size of 1×1 cm² and a polished surface prepared through the above-mentioned preparing method is chosen to be a body. A metallic copper film with a thickness of 50 nanometer is evaporated on the surface of the body by the usage of an electron beam evaporation device. Then the body with the metallic copper film is placed in an environment with a vacuum degree less than $1\times10^{-3}$ Pa and annealed at 200° C. for 2.5 h. After that, the luminescent glass element of the present example is obtained after cooling to room temperature.

EXAMPLE 11

A green luminescent glass $36K_2O.8Y_2O_3.58SiO_2.0.8Tb_2O_3$ with a size of 1×1 cm² and a polished surface prepared through the above-mentioned preparing method is chosen to be a body. A metallic zinc film with a thickness of 150 nanometer is evaporated on the surface of the body by the usage of an electron beam evaporation device. Then the body with the metallic zinc film is placed in an environment with a vacuum degree less than $1\times10^{-3}$ Pa and annealed at 350° C. for 0.5 h. After that, the luminescent glass element of the present example is obtained after cooling to room temperature.

EXAMPLE 12

A green luminescent glass $29K_2O.11Y_2O_3.50SiO_2.1.5Tb_2O_3$ with a size of 1×1 cm² and a polished surface prepared through the above-mentioned preparing method is chosen to be a body. A metallic chromium film with a thickness of 120 nanometer is evaporated on the surface of the body by the usage of an electron beam evaporation device. Then the body with the metallic chromium film is placed in an environment with a vacuum degree less than $1\times10^{-3}$ Pa and annealed at 250° C. for 2 h. After that, the luminescent glass element of the present example is obtained after cooling to room temperature.

EXAMPLE 13

A green luminescent glass $33K_2O.7Y_2O_3.58SiO_2.7Tb_2O_3$ with a size of 1×1 cm² and a polished surface prepared through the above-mentioned preparing method is chosen to be a body. A metallic nickel film with a thickness of 40 nanometer is evaporated on the surface of the body by the usage of an electron beam evaporation device. Then the body with the metallic nickel film is placed in an environment with a vacuum degree less than $1\times10^{-3}$ Pa and annealed at 80° C. for 4 h. After that, the luminescent glass element of the present example is obtained after cooling to room temperature.

EXAMPLE 14

A green luminescent glass $26K_2O.4Y_2O_3.69SiO_2.9.5Tb_2O_3$ with a size of 1×1 cm² and a polished surface prepared through the above-mentioned preparing method is chosen to be a body. A metallic cobalt film with a thickness of 180 nanometer is evaporated on the surface of the body by the usage of an electron beam evaporation device. Then the body with the metallic cobalt film is placed in an environment with a vacuum degree less than $1\times10^{-3}$ Pa and annealed at 400° C. for 1 h. After that, the luminescent glass element of the present example is obtained after cooling to room temperature.

EXAMPLE 15

A green luminescent glass $45K_2O.8Y_2O_3.48SiO_2.1.5Tb_2O_3$ with a size of 1×1 cm² and a polished surface prepared through the above-mentioned preparing method is chosen to be a body. A metallic silver-aluminum film with a thickness of 8 nanometer is evaporated on the surface of the body by the usage of an electron beam evaporation device, wherein the weight fractions of the silver and the aluminum in the metal film are respectively 80% and 20%. Then the body with the metallic silver-aluminum film is placed in an environment with a vacuum degree less than $1\times10^{-3}$ Pa and annealed at 380° C. for 2.5 h. After that, the luminescent glass element of the present example is obtained after cooling to room temperature.

EXAMPLE 16

A green luminescent glass $36K_2O.16Y_2O_3.52SiO_2.4Tb_2O_3$ with a size of 1×1 cm² and a polished surface prepared through the above-mentioned preparing method is chosen to be a body. A metallic silver-aluminum film with a thickness of 15 nanometer is evaporated on the surface of the body by the usage of an electron beam evaporation device, wherein the weight fractions of the silver and the aluminum in the metal film are respectively 90% and 10%. Then the body with the metallic silver-aluminum film is placed in an environment with a vacuum degree less than $1\times10^{-3}$ Pa and annealed at 180° C. for 3.5 h. After that, the luminescent glass element of the present example is obtained after cooling to room temperature.

EXAMPLE 17

A green luminescent glass $55K_2O.3Y_2O_3.62SiO_2.7Tb_2O_3$ with a size of 1×1 cm² and a polished surface prepared through the above-mentioned preparing method is chosen to be a body. A metallic gold-aluminum film with a thickness of 7 nanometer is evaporated on the surface of the body by the usage of an electron beam evaporation device, wherein the weight fractions of the gold and the aluminum in the metal film are respectively 80% and 20%. Then the body with the metallic gold-aluminum film is placed in an environment with a vacuum degree less than $1\times10^{-3}$ Pa and annealed at 270° C. for 1.5 h. After that, the luminescent glass element of the present example is obtained after cooling to room temperature.

EXAMPLE 18

A green luminescent glass $58K_2O.6Y_2O_3.35SiO_2.9Tb_2O_3$ with a size of 1×1 cm² and a polished surface prepared through the above-mentioned preparing method is chosen to be a body. A metallic gold-aluminum film with a thickness of 80 nanometer is evaporated on the surface of the body by the usage of an electron beam evaporation device, wherein the weight fractions of the gold and the aluminum in the metal film are respectively 90% and 10%. Then the body with the metallic gold-aluminum film is placed in an environment with a vacuum degree less than $1\times10^{-3}$ Pa and annealed at 600° C. for 4.5 h. After that, the luminescent glass element of the present example is obtained after cooling to room temperature.

The invention claimed is:
1. A method for raising the luminous efficiency of a field emissive luminescent material, comprising following steps: taking a luminescent glass as a body; forming a nonperiodic metal film having metal micro-nano structures on a surface of the luminescent glass body to prepare a luminescent glass element; irradiating a cathode ray to the luminescent glass element, wherein the cathode ray penetrates the metal film and excites the luminescent glass body to luminesce; wherein, a chemical general formula of the luminescent glass body is $aM_2O \cdot bY_2O_3 \cdot cSiO_2 \cdot dTb_2O_3$, wherein M is an alkali metal, and a, b, c and d are molar fractions, ranges of which are respectively as follows: the range of a is 25~60, the range of b is 0.01~15, the range of c is 40~70 and the range of d is 0.01~15.

2. A luminescent glass element comprising a luminescent glass body, wherein a metal film having metal microstructure is arranged on a surface of the luminescent glass body; the luminescent glass body comprises a composite oxide with the following chemical general formula:

$$aM_2O \cdot bY_2O_3 \cdot cSiO_2 \cdot dTb_2O_3,$$

wherein M is an alkali metal, and a, b, c and d are molar fractions, ranges of which are respectively as follows: the range of a is 25~60, the range of b is 0.01~15, the range of c is 40~70 and the range of d is 0.01~15.

3. The luminescent glass element according to claim 2, wherein the alkali metal is selected from the group consisting of Na, K and Li.

4. The luminescent glass element according to claim 2, wherein the metal of the metal film is selected from the group consisting of gold, silver, aluminum, copper, titanium, iron, nickel, cobalt, chromium, platinum, palladium, magnesium and zinc.

5. The luminescent glass element according to claim 4, wherein the metal of the metal film is selected from the group consisting of gold, silver and aluminum.

6. The luminescent glass element according to claim 2, wherein the thickness of the metal film is 0.5 nanometer ~200 nanometer.

7. The luminescent glass element according to claim 6, wherein the thickness of the metal film is 1 nanometer ~100 nanometer.

8. A method for preparing a luminescent glass element, comprising following steps:

preparing a luminescent glass body which comprises composite oxides with a following chemical general formula: $aM_2O \cdot bY_2O_3 \cdot cSiO_2 \cdot dTb_2O_3$, wherein M is an alkali metal, and a, b, c and d are molar fractions, ranges of which are respectively as follows: the range of a is 25~60, the range of b is 0.01~15, the range of c is 40~70 and the range of d is 0.01~15;

forming a metal film on a surface of the luminescent glass body; and annealing the luminescent glass body and the metal film in vacuum so that the metal film forms metal microstructures, and then obtaining the desired luminescent glass element after cooling.

9. The method for preparing a luminescent glass element according to claim 8, wherein preparing steps for the luminescent glass body are as follows: taking alkali metal salt, $SiO_2$, $Y_2O_3$ and $Tb_4O_7$ in their respective corresponding molar fraction as raw materials; melting the raw materials at 1200° C.~1500° C.; placing a melted product in a reducing atmosphere after cooling; then annealing a reduced product at 600° C.~1100° C. to obtain the luminescent glass body.

10. The method for preparing a luminescent glass element according to claim 8, wherein the metal film is formed through sputtering or evaporating a metal onto the surface of the luminescent glass body.

11. The method for preparing a luminescent glass element according to claim 8, wherein, the annealing in vacuum is proceeded at 50° C.~650° C. for 5 minutes~5 hours.

12. The method for preparing a luminescent glass element according to claim 11, wherein, the annealing in vacuum is proceeded at 100° C~500° C. for 15 minutes~3 hours.

\* \* \* \* \*